United States Patent
Ghannam et al.

(10) Patent No.: US 9,403,479 B2
(45) Date of Patent: Aug. 2, 2016

(54) VEHICLE AND VEHICLE SEAT BELT SYSTEM

(71) Applicant: FORD GLOBAL TECHNOLOGIES, LLC, Dearborn, MI (US)

(72) Inventors: Mahmoud Yousef Ghannam, Canton, MI (US); Bill Pappas, Oxford, MI (US); Abraham G. Philip, Rochester Hills, MI (US); Helinda Ho, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/470,464

(22) Filed: Aug. 27, 2014

(65) Prior Publication Data

US 2016/0059778 A1 Mar. 3, 2016

(51) Int. Cl.
| | |
|---|---|
| *B60Q 3/02* | (2006.01) |
| *B60R 22/00* | (2006.01) |
| *B60R 22/18* | (2006.01) |
| *A44B 11/25* | (2006.01) |
| *B60R 22/48* | (2006.01) |

(52) U.S. Cl.
CPC .......... *B60Q 3/0243* (2013.01); *A44B 11/2565* (2013.01); *B60Q 3/0209* (2013.01); *B60Q 3/0286* (2013.01); *B60Q 3/0293* (2013.01); *B60R 22/00* (2013.01); *B60R 22/18* (2013.01); *B60R 2022/1806* (2013.01); *B60R 2022/1818* (2013.01); *B60R 2022/4866* (2013.01)

(58) Field of Classification Search
CPC .... A44B 11/2565; B60R 22/03; B60R 22/18; B60R 22/24; B60R 2022/021; B60R 2022/4866; B60Q 3/0286; B60Q 3/0209
USPC ............ 180/268, 270; 280/801.1, 801.2, 807, 280/808; 297/481, 486, 468, 474, 482; 362/488
See application file for complete search history.

(56) References Cited

U.S. PATENT DOCUMENTS

| | | |
|---|---|---|
| 4,365,285 A | 12/1982 | Brundidge |
| 5,132,880 A | 7/1992 | Kawamura |

(Continued)

FOREIGN PATENT DOCUMENTS

| | | | |
|---|---|---|---|
| DE | 202004007872 U1 | 9/2004 | |
| JP | 2000159060 A * | 6/2000 | .............. B60R 22/48 |
| WO | 02/05675 A1 | 1/2002 | |

OTHER PUBLICATIONS

Seatbelt/Energy Management, Occupant Safety Systems, "ISB—Illuminated Seatbelt Buckle", TRW, TRW Automotive 2013, 1 page, www.trw.com.

(Continued)

*Primary Examiner* — Keith Frisby
(74) *Attorney, Agent, or Firm* — Frank A. MacKenzie; Brooks Kushman P.C.

(57) ABSTRACT

A vehicle having seat belt system is provided. The vehicle includes a D-ring having a light source, a belt strap passing through the D-ring, a tongue connected to the belt strap, a buckle, and a controller programmed to illuminate the light source in response to a detected trigger condition.

19 Claims, 3 Drawing Sheets

(56) References Cited

U.S. PATENT DOCUMENTS

| | | |
|---|---|---|
| 5,149,189 A | 9/1992 | Kawamura |
| 5,174,643 A * | 12/1992 | Priesemuth ................. 362/464 |
| 5,181,773 A | 1/1993 | Colvin |
| 6,268,663 B1 * | 7/2001 | Abe et al. ................... 307/10.6 |
| 7,797,803 B2 | 9/2010 | Falb et al. |
| 2006/0274540 A1 * | 12/2006 | Klaver et al. ................ 362/479 |
| 2009/0250593 A1 * | 10/2009 | Orlewski et al. ............. 250/206 |
| 2009/0322507 A1 * | 12/2009 | Aoki et al. ................. 340/457.1 |
| 2010/0013622 A1 * | 1/2010 | Rumps et al. ............. 340/457.1 |
| 2014/0239853 A1 * | 8/2014 | Woodham ................... 315/362 |

OTHER PUBLICATIONS

Newcomb, Douglas, "Car Tech Spotlight: Lexus LS 460 lighted seat-belt clasp, One of several small things that add up to a better driving experience for this full size luxury sedan", Autos, Exhaust Notes, Making sense of your automotive world, May 13, 2014, 1-3 pages.

\* cited by examiner

VEHICLE AND VEHICLE SEAT BELT SYSTEM

TECHNICAL FIELD

The present disclosure relates to vehicles and seatbelt systems for vehicles.

BACKGROUND

During nighttime or low ambient light conditions it may be difficult for vehicle occupants to locate elements of a seat belt system in a vehicle. Inserting the seat belt tongue into the buckle may also be difficult for vehicle occupants during nighttime or low ambient light conditions, which may lead to vehicle occupants leaving the seatbelt in an unbuckled condition.

SUMMARY

A seat belt system for a vehicle seat is provided. The seat belt system includes a D-ring assembly including a light source; a tongue; an anchor; a retractable belt strap that passes through the D-ring and tongue, and then terminates at the anchor; and a buckle that is configured to receive the tongue.

A vehicle is provided. The vehicle includes a D-ring having a light source, a belt strap passing through the D-ring, a tongue connected to the belt strap, a buckle, and a controller programmed to illuminate the light source in response to either a door of the vehicle being opened or an ignition of the vehicle being activated.

A method of illuminating a seat belt system is provided. The method includes activating a light source disposed within a D-ring assembly of a seat belt system in response to a detected trigger condition.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
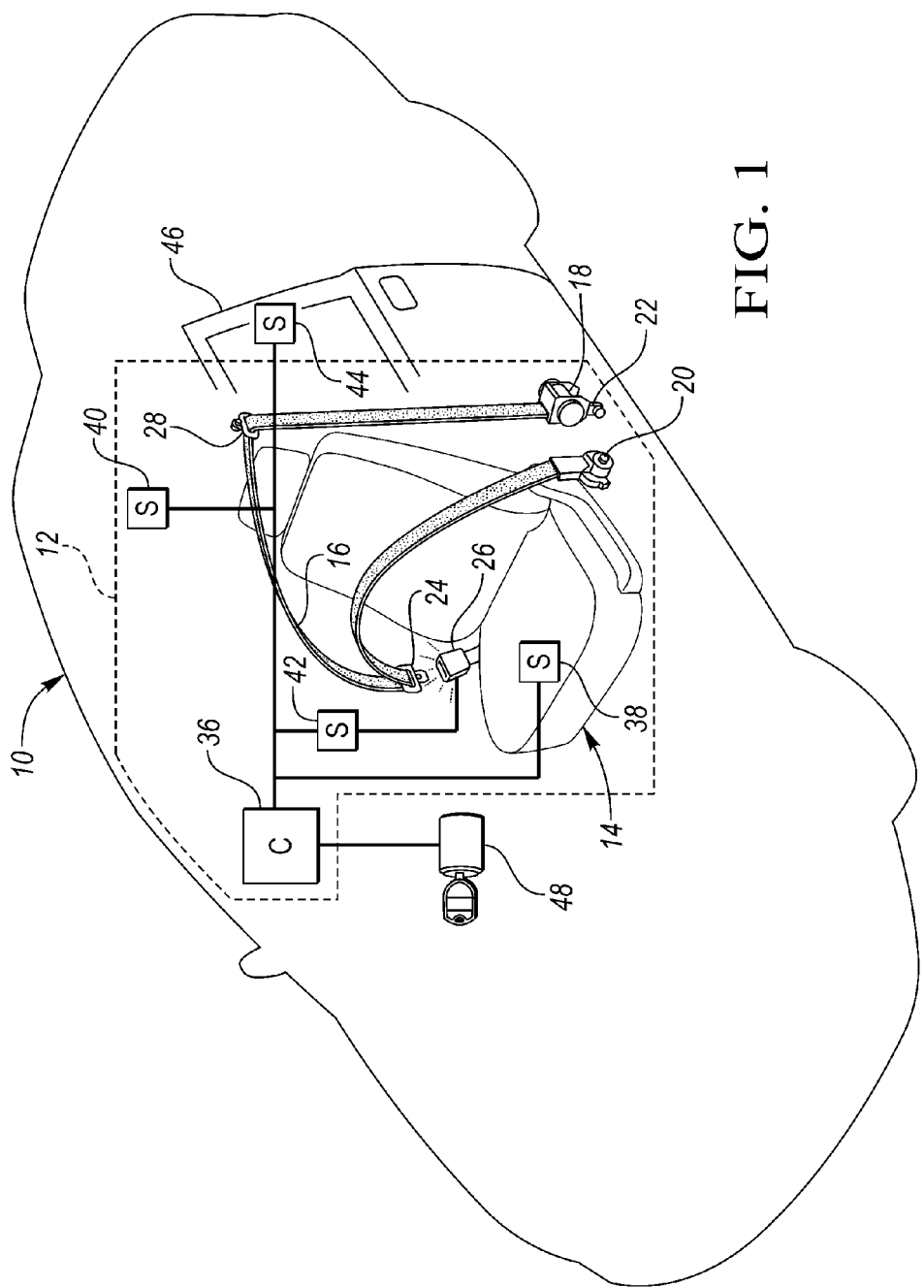
FIG. 1 illustrates a vehicle having a seat belt system for a vehicle seat.

Referring to FIG. 1, a vehicle 10 having seat belt system 12 for a vehicle seat 14 is illustrated. The seat belt system 12 includes belt strap 16. The belt strap 16 may be a retractable belt strap. A retractor 18 may be attached to the belt strap 16 and configured to retract the belt strap 16 into a stationary position when the seat belt system 12 is not being used. The retractor 18 may be spring loaded in order to bias the belt strap 16 in a retraced position. The retractor 18 may also include a spool that the belt strap 16 in configured to wrap around. The belt strap 16 includes anchors that may be utilized to secure the belt strap 16 to the vehicle 10, vehicle seat 14, or other locations within the vehicle 10. The embodiment of FIG. 1 depicts two anchors 20, 22. However, the disclosure should not be limited to embodiments with belt straps that have two anchors, but should include belt straps having any number of anchors. A tongue 24 is connected to the belt strap 16. A buckle 26 is configured to receive the tongue 24. When the tongue 24 is engaged with the buckle 26 the seat belt system 12 is in a buckled condition. When the tongue in not engaged with the buckle 26 the seat belt system 12 is in an unbuckled condition. The seat belt system 12 also includes a D-ring 28 (or D-ring assembly) that may include an anchor to secure the D-ring 28 to the vehicle 10, vehicle seat 14, or other locations within the vehicle 10. The belt strap 16 is fed through the D-ring 28 which guides the belt strap 16 into a desired position.

Figure 2:
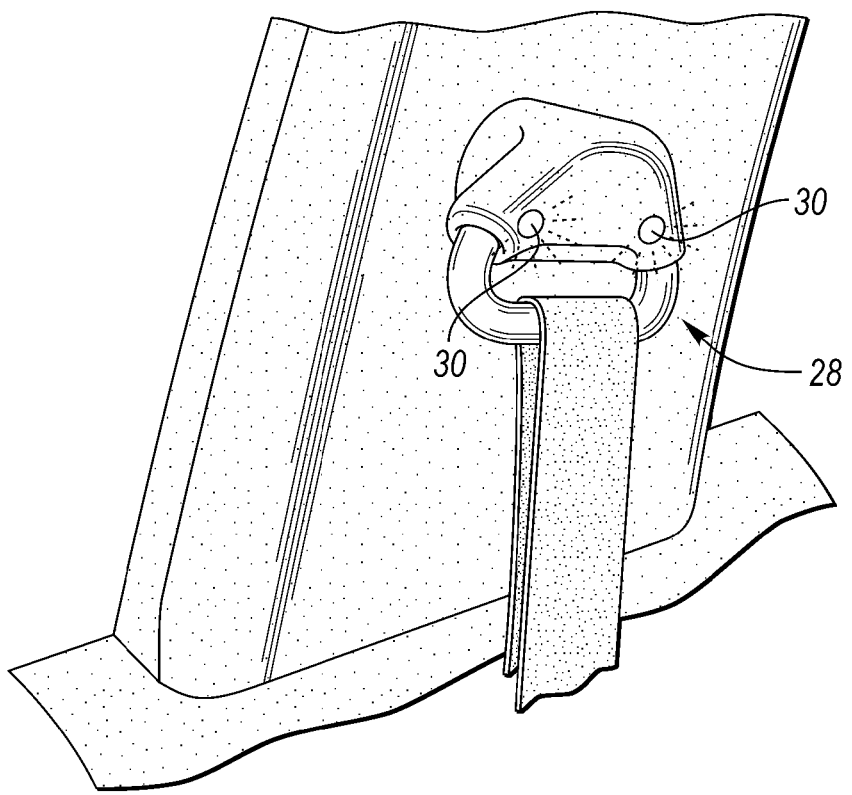
FIG. 2 illustrates a D-ring assembly for a seat belt system that includes a light source.

Referring to FIG. 2, the D-ring 28 includes one or more light sources 30 that are utilized to illuminate the D-ring 28 when a vehicle driver or occupant may need to locate the D-ring 28 and conditions are such that it may difficult to locate the D-ring 28. The light sources 30 may be incandescent type bulbs, LED's, or any other form of light source. The design of the light source 30 is not limited to a certain pattern of illumination and may include arrows, spots, lines, shapes, etc., located within different positions of the D-ring 28. The light source 30 may, in the alternative, be located external of the D-ring 28 and configured to direct light onto the D-ring 28. The light sources 30 may also include different colors of illumination.

Figure 3:
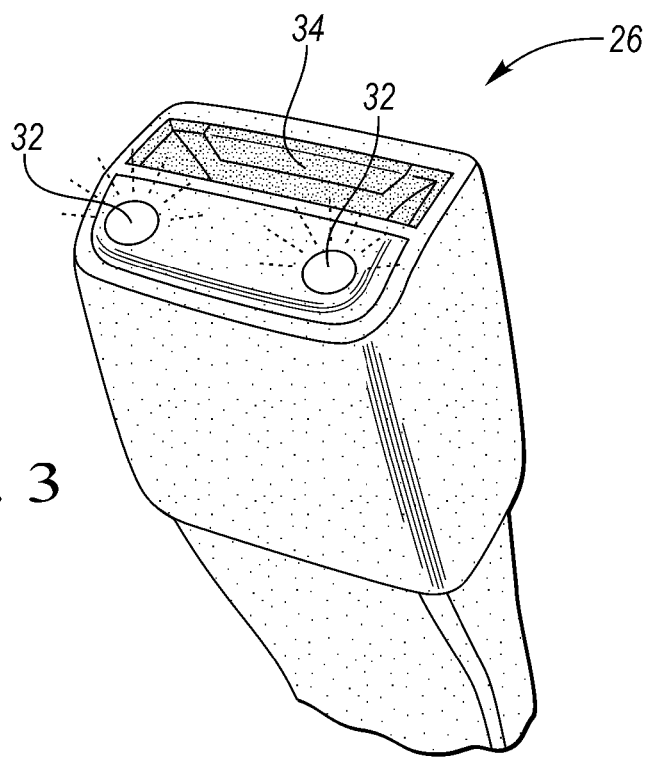
FIG. 3 illustrates a buckle for a seat belt system that includes a light source.

Referring to FIG. 3, the buckle 26 includes one or more light sources 32 that are utilized to illuminate the buckle 26 when a vehicle driver or occupant may need to locate the buckle 26 and conditions are such that it may difficult to locate the buckle 26. The light sources 32 may be incandescent type bulbs, LED's, or any other form of light source. The design of the light source 32 is not limited to a certain pattern of illumination and may include arrows, spots, lines, shapes, etc., located within different positions of the buckle 26, including internally so that the light source 32 illuminates the slot 34 where the tongue 24 engages the buckle 26. The light source 32 may, in the alternative, be located external of the buckle 26 and configured to direct light onto the buckle 26. The light source 32 may also include different colors of illumination.

With continued reference to FIG. 1, the seat belt system 12 includes a controller 36. The controller 36 is programmed to illuminate either or both the light sources 30, 32 of the D-ring 28 and the buckle 26, in response to one or multiple detected trigger conditions. The several triggering conditions are described below, in the description of the control method of FIG. 4.

A first sensing device 38 is in communication with the controller 36. The first sensing device is configured to sense an occupancy status of the vehicle seat 14 (whether or not a person is sitting on the vehicle seat). The sensing device 38 may be a pressure sensor that detects pressure generated by the weight of someone that is sitting on the vehicle seat 14. In the alternative, the sensing device 38 may be a photoelectric sensor or laser sensor that detects the presence of an occupant in the vehicle seat 14, when a through beam generated by the sensing device 38 is broken. A photoelectric or laser sensor may include a transmitter and receiver combination that generates the through beam and detects when a break occurs in the through beam, or may include a transceiver/reflector combination that detects a break in the through beam. The disclosure however, should not be limited to pressure sensors and through beam sensors, but should include any type of sensor or switch that is capable of detecting the presence of an occupant in the vehicle seat 14 and capable of relaying the information to a controller, computer, processor, microprocessor, or central processing unit.

A second sensing device 40 is in communication with the controller 36. The second sensing device 40 may be a photo sensor or photo detector that is configured to detect the ambient light conditions (the light intensity). The second sensing device 40 may be configured to detect the ambient light conditions inside of the vehicle 10, outside of the vehicle 10, or multiple sensors may be used to detect the ambient light conditions both inside and outside of the vehicle 10. The disclosure however, should not be limited to photo sensors and photo detectors, but should include any type of sensor or switch that is capable of detecting light conditions and capable of relaying the information to a controller, computer, processor, microprocessor, or central processing unit.

A third sensing device 42 is in communication with the controller 36. The third sensing device 42 is configured to detect whether the tongue 24 is engaged with the buckle 26 in a buckled or unbuckled condition. The third sensing device 42 may be a proximity sensor that is configured to detect the presence of the tongue 24 within the buckle or may be a limit switch that is triggered when the tongue 24 is placed with the buckle 26. The disclosure however, should not be limited to proximity sensors and limit switches, but should include any type of sensor or switch that is capable of detecting the presence of the tongue 24 within the buckle 26 and capable of relaying the information to a controller, computer, processor, microprocessor, or central processing unit.

A fourth sensing device 44 is in communication with the controller 36. The fourth sensing device 44 is configured to detect whether a vehicle door 46 is in an open or closed position. The fourth sensing device 44 may be a proximity sensor that is configured to detect the presence of the vehicle door 46 in either the open or closed position, or may be limit switch that is triggered when the vehicle door 46 is in either the open or closed position. The fourth sensing device 44, however, should not be limited to specific types of sensors and switches, but should include any type of sensor or switch that is capable of detecting the open or closed positions of the vehicle door 46 and capable of relaying the information to a controller, computer, processor, microprocessor, or central processing unit.

A vehicle ignition 48 is in communication with the controller 36. The vehicle ignition 48 relays to the controller 36 whether the ignition is an activated or deactivated state. The vehicle ignition 48 may relay the information directly to the controller 36 or include a sub-controller that relays the information.

While illustrated as one controller, the controller 36 may be part of a larger control system and may be controlled by various other controllers throughout the vehicle 10, such as a vehicle system controller (VSC). It should therefore be understood that the controller 36 and one or more other controllers can collectively be referred to as a "controller" that controls various actuators in response to signals from various sensors to control functions. The controller 36 may include one or more microprocessors or central processing units (CPUs) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 36 in controlling the vehicle 10.

Figure 4:
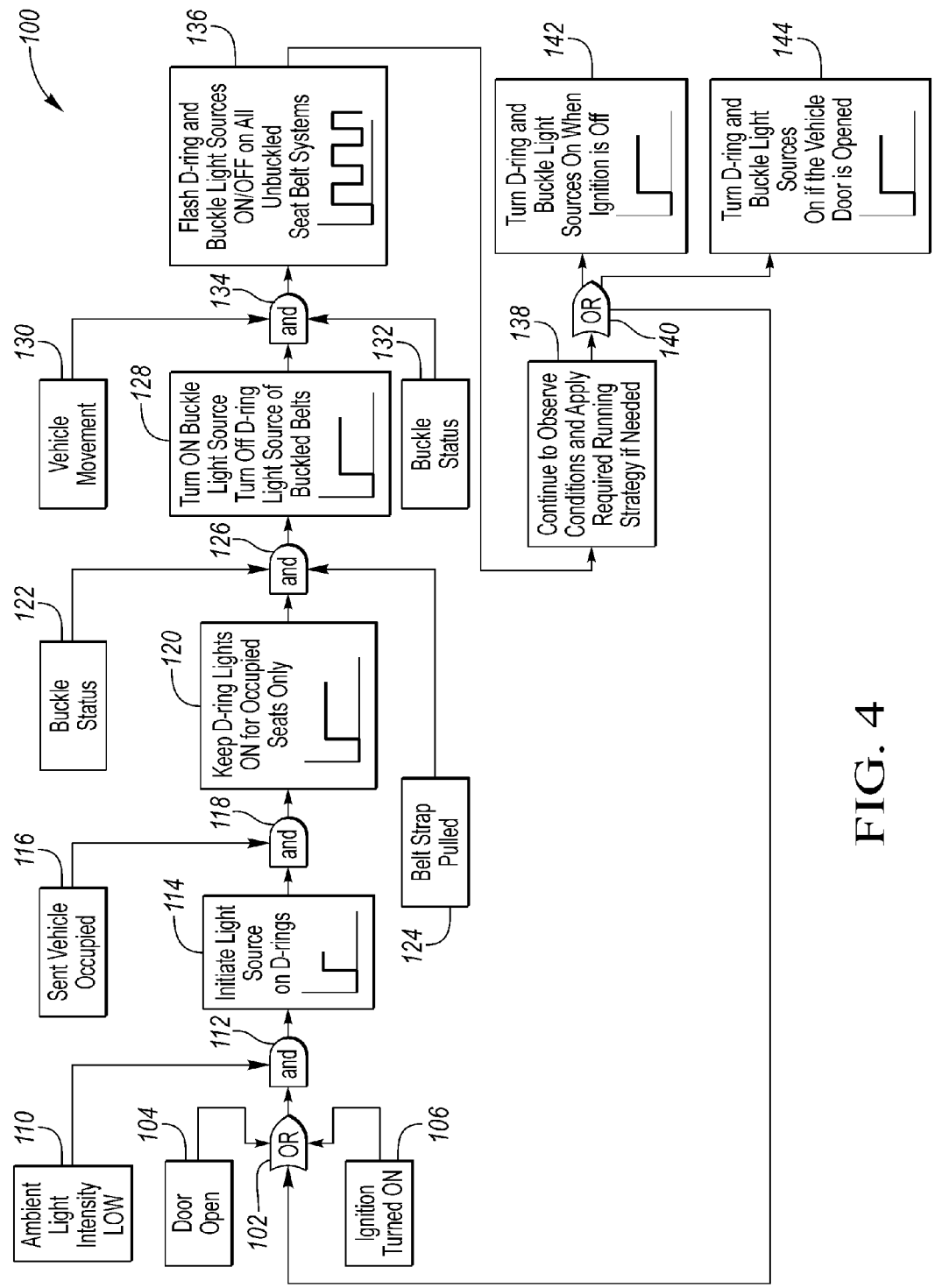
FIG. 4 illustrates a control method for illuminating the D-ring and buckle for a vehicle seat belt system.

Referring to FIG. 4, a control method 100 of illuminating either the D-ring 28 and/or the buckle 26 of the seat belt system 12 is illustrated. The method 100 should not be construed as limited to the configuration as illustrated in FIG. 4, but should include variations where the steps are rearranged and variations where some of the steps may be removed entirely. The method 100 may be implemented using software code contained within the controller 36. In other embodiments, the method 100 may be implemented in other controllers, or distributed among multiple controllers.

The method 100 first determines at an 'or' block 102 whether the vehicle door 46 is open at step 104 or if the vehicle ignition 48 is in an activated state at step 106. If either the vehicle door 46 is open or the vehicle ignition 48 is in an activated state and the ambient light conditions fall below a predetermined threshold at step 110, an 'and' block 112 will trigger the illumination of the light source 30 of the D-ring 28 for a predetermined period of time at step 114. The method 100 may, however, not require measuring that the ambient light conditions at step 110 and illuminate the light source 30 of the D-ring 28 if either the of the conditions of steps 104 and 106 have been met.

At step 116 it is determined if the vehicle seat 14 is occupied. If the vehicle seat is occupied at step 116 and the light source 30 of the D-ring 28 has been illuminated for a predetermined period of time at step 114, an 'and' block 118 will trigger step 120 where the light source 30 of the D-ring 28 will remain illuminated beyond the predetermined period of time at step 114. The vehicle 10 may have more than one vehicle seat 14 where each seat has a seat belt system 12. In instances where there is more than one vehicle seat 14, the continued illuminated of the light source 30 of the D-ring 28 at step 120 may be applied only to occupied seats.

At step 122 the buckle status, buckle or unbuckled, is determined. At step 124 it is determined whether the belt strap 16 has been pulled from a stationary or retracted position. If the light source 30 of the D-ring 28 remained illuminated at step 120, the belt status is unbuckled at step 122, and the belt strap 16 has been pulled from a stationary or retracted position at step 124, an 'and' block 126 will trigger step 128 where the light source 32 of the buckle 26 is illuminated. However, if the ambient light conditions are not below a predetermined threshold as determined at step 110, the light source 32 of the buckle 26 may not be illuminated in step 128. The 'and' block 126 may also trigger the termination of the illumination of the light source 30 of the D-ring 28. Once the buckle status changes to buckled, illumination of light source 30 of the D-ring 28 and/or the light source 32 of the buckle 26 may be terminated.

At step 130, it is determined if there is movement of the vehicle 10. The vehicle movement may be determined by a sensor that detects the movement of the wheels of the vehicle 10, an accelerometer, or any sensor capable detecting motion of the vehicle 10. At step 132 the buckle status, buckle or unbuckled, is determined again. If the light source 32 of the buckle 26 was illuminated at step 128, vehicle movement is detected at step 130, and the buckle status at step 132 is unbuckled, an 'and' block 134 will trigger step 136 where the light sources 30, 32 of the D-ring 28 and the buckle 26 may either or both be triggered to flash on and off until the seat belt system 12 is placed in a buckled condition. The flashing on and off of the light sources 30, 32 in step 136 may last for only a predetermined period of time or indefinitely until the seat belt system 12 is placed in a buckled condition. The flashing on and off of the light sources 30, 32 may occur only in the vehicle seats 14 that are both occupied and unbuckled in instances where there is more than one vehicle seat 14 and each has a seat belt system 12. The flashing on and off of the light sources 30, 32 in step 136 may also not occur if the ambient light conditions are not below a predetermined threshold as determined at step 110.

At step 136, an audible message (such as a chiming tone or voice message), a text message on a video screen, a symbol on the dash or control panel, or other response may be used in addition to or in place of flashing on and off of the light sources 30, 32.

At step 138, the conditions of the method 100 of illuminating either the D-ring 28 and/or the buckle 26 of the seat belt system 12 are observed and input into an 'or' block 140. The conditions include, but are not limited to, whether the vehicle 10 is moving, the ignition 48 is in the activated or deactivated state, the ambient light conditions are below the predetermined threshold, whether the tongue 24 is engaged with the buckle 26 in a buckled or unbuckled condition, etc. If the conditions indicate that it is necessary to restart the method 100 the 'or' block 140 will trigger re-starting the process at step 102.

If vehicle ignition 48 is deactivated the 'or' block 140 will trigger step 142. At step 142, the light sources 30, 32 of the D-ring 28 and the buckle 26 may either or both be triggered when the ignition 48 is deactivated. The light sources 30, 32 may be triggered for a predetermined period of time or until another vehicle condition, such as the vehicle door 46 closing, necessitates terminating the illumination of the light sources 30, 32.

If the vehicle door 46 is opened, the 'or' block 140 will trigger step 144. At step 144, the light sources 30, 32 of the D-ring 28 and the buckle 26 may either or both be triggered when the vehicle door 46 is opened. The light sources 30, 32 may be triggered for a predetermined period of time, until the vehicle door is closed, or until another vehicle condition that necessitates terminating the illumination of the light sources 30, 32 occurs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat belt system for a vehicle seat comprising:
   a D-ring assembly including a visible-light source;
   a tongue;
   an anchor;
   a retractable belt strap passing through the D-ring and tongue, and terminating at the anchor;
   a buckle configured to receive the tongue; and
   a controller programmed to, in response to a detected trigger condition requiring a vehicle occupant to locate the position of the D-ring, illuminate the visible-light source.

2. The system of claim 1, wherein the buckle includes a light source.

3. The seat belt system for a vehicle seat of claim 1, wherein the trigger condition is a door of a vehicle being opened.

4. The seat belt system for a vehicle seat of claim 1, wherein the trigger condition is an ignition of a vehicle being activated.

5. A vehicle comprising:
   a D-ring having a visible-light source;
   a belt strap passing through the D-ring;
   a tongue connected to the belt strap;
   a buckle; and
   a controller programmed to, in response to either a door of the vehicle being opened or an ignition of the vehicle being activated, illuminate the visible-light source.

6. The vehicle of claim 5, wherein the controller is further programmed to illuminate the light source of the D-ring only if ambient light conditions fall below a predetermined threshold.

7. The vehicle of claim 6, wherein the controller is further programmed to illuminate the light source of the D-ring for a predetermined period of time after either the door of the vehicle is opened or the ignition of the vehicle is activated.

8. The vehicle of claim 7, wherein the controller is further programmed to illuminate the light source of the D-ring after the predetermined period of time if a seat of the vehicle is occupied.

9. The vehicle of claim 8, wherein the controller is further programmed to terminate the illumination of the light source of the D-ring if the belt strap is pulled from a stationary position and the tongue and buckle are engaged.

10. The vehicle of claim 5, wherein the buckle has a light source.

11. The vehicle of claim 10, wherein the controller is further programmed to illuminate the light source of the buckle if ambient light conditions fall below a predetermined threshold.

12. The vehicle of claim 11, wherein the controller is further programmed to illuminate the light source of the buckle if the belt strap is pulled from a stationary position and the tongue and buckle are not engaged.

13. The vehicle of claim 12, wherein the controller is further programmed to terminate the illumination of the light source of the buckle if the tongue and buckle are engaged.

14. The vehicle of claim 10, wherein the controller is further programmed to, in response to vehicle movement and an unbuckled condition of the tongue and buckle, trigger a flashing of the light source of the D-ring and the light source of the buckle.

15. The vehicle of claim 10, wherein the controller is further programmed to illuminate the light source of the D-ring and the light source of the buckle for a predetermined period of time after the ignition of the vehicle is deactivated.

16. The vehicle of claim 10, wherein the controller is further programmed to illuminate the light source of the D-ring and the light source of the buckle for a predetermined period of time after the ignition of the vehicle is deactivated and the door of the vehicle has been opened.

17. The vehicle of claim 5 further comprising a sensing device in communication with the controller and configured to relay an occupancy status of a seat of the vehicle to the controller.

18. The vehicle of claim 5 further comprising a sensing device in communication with the controller and configured to relay ambient light conditions to the controller.

19. The vehicle of claim 5 further comprising a sensing device in communication with the controller and configured to relay an open/closed condition of the door of the vehicle.

* * * * *